US005918162A

United States Patent [19]

Ito et al.

[11] Patent Number: 5,918,162

[45] Date of Patent: Jun. 29, 1999

[54] ANTENNA UNIT AND PORTABLE RADIO TERMINAL WITH A FEEDING CIRCUIT AND SPIRAL ANTENNA

[75] Inventors: Hiroki Ito, Kanagawa; Nobuo Sato, Miyagi; Yoshiki Kanayama; Shinichi Kuroda, both of Saitama, all of Japan

[73] Assignee: Sony Corporation, Tokyo, Japan

[21] Appl. No.: 08/833,122

[22] Filed: Apr. 4, 1997

[30] Foreign Application Priority Data

Apr. 9, 1996 [JP] Japan .................................... 8-111993

[51] Int. Cl.[6] ........................................................ H04Q 7/38

[52] U.S. Cl. ............................................... 455/82; 343/713

[58] Field of Search ................................ 455/82, 83, 282, 455/291; 333/126, 132; 343/713, 730, 803, 853

[56] References Cited

U.S. PATENT DOCUMENTS

| | | | |
|---|---|---|---|
| 4,340,891 | 7/1982 | Phillips | 343/713 |
| 5,170,493 | 12/1992 | Roth | 455/82 |

*Primary Examiner*—William Cumming
*Attorney, Agent, or Firm*—Jay H. Maioli

[57] ABSTRACT

An antenna unit in which fine antenna characteristic can be obtained when the antenna is contained/pulled out. When the second antenna (9) is contained, the second antenna is electrically disconnected from the feeding circuits (5, 7) by the antenna cover (13), so that only the first antenna (8) operates as antenna. On the other hand, when the second antenna is pulled out, the first antenna is compressed by the antenna stopper element (21) and the electrical length is varied, so that only the second antenna operates as antenna. As a result, fine antenna characteristic can be obtained when the antenna is contained/pulled out.

8 Claims, 6 Drawing Sheets

ANTENNA UNIT AND PORTABLE RADIO TERMINAL WITH A FEEDING CIRCUIT AND SPIRAL ANTENNA

BACKGROUND OF THE INVENTION

1. Field of the Invention

The present invention relates to an antenna unit and a portable radio terminal, and more particularly to an improvement of a small portable radio terminal.

2. Description of the Related Art

In recent years, portable radio terminals have been minimized and lightened for the improvement of portability, thus a small antenna unit has been needed. Then, a whip antenna which can be contained in the main body when carrying, and pulled out from the main body when talking has been developed.

The early portable radio terminals would use the simple whip antenna. However, the whip antenna had a demerit as follows: While the antenna would operate as a monopole antenna when the portable radio terminal is used by pulling out from the main body, the antenna would not generate a sufficient gain when contained in the main body. It is because that the antenna contained in the main body was arranged close to the ground, therefore, the input impedance increased and almost could not be matched.

Then, to improve the gain when the antenna is contained, a top-loading whip antenna in which a helical antenna is electrically connected to the upper end of linear antenna has been utilized. When operating this whip antenna by pulling the antenna out from the main body when in use, radiowaves can be radiated both from the helical antenna and the linear antenna, and when the antenna is contained in the main body, radiowaves can be radiated mainly from the upper end of the helical antenna.

However, this whip antenna has a linear antenna which would not contribute to radiation of radiowaves when contained. The linear antenna should be operated as an open stub. The open stub affects input impedance of the antenna and causes the matching to be slightly disturbed depending on the distance from a substrate in the containing space. Moreover, if the shield is not perfect, the linear antenna contained in the main body picks up a signal, and also a signal enters the shield. The whip antenna had some problems as described above and it could not be said that the construction of this whip antenna was fine.

Then, an antenna unit in which a linear antenna is electrically disconnected when contained was developed. The conventional example of the antenna unit will be described with FIGS. 1 and 2. FIG. 1 shows the state where a linear antenna is contained, and FIG. 2 shows the state where the linear antenna is pulled out. However, the general view of the portable radio terminal is omitted and only the neighborhood of the antenna unit will be described.

The main body 2 of the portable radio terminal 1 is made of a nonmetallic material, as which a circuit board 3 necessary as radio terminal is contained. Various circuits such as a transmitting/receiving circuit 4, and an antenna matching circuit 5, are mounted on the circuit board 3.

The transmitting/receiving circuit 4 and the antenna matching circuit 5 mounted on the circuit board 3 have a function as follows: The transmitting/receiving circuit 4 generates a transmitting signal in the form of the predetermined signal and demodulates a receiving signal received through the antenna unit 6. The antenna matching circuit 5 matches a characteristic impedance from the transmitting/receiving circuit 4 with the input impedance of the antenna unit 6, feeds the transmitting signal supplied from the transmitting/receiving circuit 4 to the antenna unit 6 via a metallic feeding spring 7, and feeds the receiving signal received with the antenna unit 6 to the transmitting/receiving circuit 4.

The antenna unit 6 is composed of two antennas, i.e., a spiral antenna 8 in which a conductor is formed in a spiral, and a linear antenna 9 in which a conductor is formed in a straight line. The antenna unit 6 is attached to the main body 2 by screwing the antenna supporting metal fitting 11 in the antenna unit 6.

The spiral antenna 8 is always connected electrically and mechanically to the antenna supporting metal fitting 11 and always fed electric power via the antenna supporting metal fitting 11, an antenna attaching metal fitting 10, and the feeding spring 7 in succession. The circumference of spiral antenna 8 is covered with a nonconductive antenna cover 12 to avoid touching the user's body.

The linear antenna 9 can be slid in the spiral antenna 8 in the direction of the center axis of the spiral (it is shown by an arrow "a" in FIG. 1), so that the linear antenna 9 can be contained/pulled out. The circumference of linear antenna 9 is covered with a nonconductive antenna cover 13 to avoid touching the user's body when the user pulls out the antenna. The upper end of antenna cover 13 is extended upward and the section is formed in a T-shape so that when the linear antenna 9 is contained, it can be prevented from falling the portable radio terminal 1. The T-shape unit has a function as a knob when the linear antenna 9 is pulled out (hereinafter, it is referred to as a containing stopper/knob 14).

A metallic stopper in pulling out 15 of which the section is formed in convex is attached to the lower end of linear antenna 9, to be mechanically and electrically connected. The stopper in pulling out 15 has a function to protect the linear antenna 9 from becoming dislodged from the main body 2 when the linear antenna 9 is pulled out. Furthermore, the stopper in pulling out 15 is pinched with the antenna supporting metal fitting 11 when the linear antenna 9 is pulled out to electrically connect the linear antenna 9 to the feed spring 7 via the antenna supporting metal fitting 11 and the antenna attaching metal fitting 10 in succession.

In the antenna unit 6 having the structure described above, as shown in FIG. 1, when the linear antenna 9 is contained, the bottom of containing stopper/knob 14 which is a part of the antenna cover 13 is pinched with the antenna supporting metal fitting 11, thus the linear antenna 9 is fixed in the contained state. At this time, the linear antenna 9 is connected to the antenna supporting metal fitting 11 via the nonconductive antenna cover 13, so that the linear antenna 9 is electrically disconnected from the feeding spring 7. As a result, the linear antenna 9 would not operate as an antenna.

On the contrary, the spiral antenna 8 is always electrically connected to the antenna supporting metal fitting 11, and electrically connected to the feeding spring 7 via the antenna supporting metal fitting 11 and the antenna attaching metal fitting 10 in the main body 2. Thereby, the spiral antenna 8 would operate as the helical antenna grounded by the ground conductor of the circuit board 3 and the shield case.

In this manner, in the antenna unit 6, the linear antenna 9 would not operate because the linear antenna 9 is electrically disconnected when the antenna is contained. Thereby, the problem as described above can be solved and fine antenna characteristic can be obtained.

As shown in FIG. 2, when the antenna is pulled out, the stopper in pulling out 15 provided at the lower end of linear antenna 9 is pinched with the antenna supporting metal fitting 11 so that the linear antenna 9 is fixed in the pulled out state. At this time, the linear antenna 9 is electrically connected to the antenna supporting metal fitting 11 via the metallic stopper in pulling out 15, and electrically connected to the feeding spring 7 via the antenna supporting metal fitting 11 and the antenna attaching metal fitting 10 in the main body 2. Thereby, the linear antenna 9 would operate as the monopole antenna grounded by the ground conductor of the circuit board 3 and the shield case. Since the spiral antenna 8 is always fed electric power, the spiral antenna 8 would operate as an antenna also when the antenna is pulled out. However, the linear antenna 9 mainly operates and the spiral antenna 8 operates as a support antenna in this case.

In this manner, when the antenna is pulled out, both the linear antenna 9 and the spiral antenna 8 operate, and when the antenna is contained, the linear antenna 9 is electrically disconnected and only the spiral antenna 8 operates. Thereby, in the antenna unit 6, fine antenna characteristic can be obtained when the antenna is contained comparing with the aforesaid top-loading antenna.

By the way, in the antenna unit 6 as described above, although antenna characteristic when the antenna is contained can be improved by electrically disconnecting the linear antenna 9 when in contained, it was insufficient as an antenna unit because there has been a problem when the antenna is pulled out as follows:

As described above, when the antenna is pulled out, the linear antenna 9 mainly operates and the spiral antenna 8 operates as support. However, since the operational frequency band of spiral antenna 8 is the same as the operational frequency band of linear antenna 9 at this time, the antenna characteristic of mainly operating linear antenna 9 would be disturbed by the spiral antenna 8, thus fine antenna characteristic could not be obtained when the antenna is pulled out.

SUMMARY OF THE INVENTION

In view of the foregoing, an object of the present invention is to provide an antenna unit and a portable radio terminal in which fine antenna characteristic can be obtained when the antenna is contained/pulled out.

The foregoing object and other objects of the invention have been achieved by the provision of an antenna unit in which the first antenna provides antenna compressing means for pushing up and compressing the first antenna to vary the electrical length of first antenna when the second antenna is pulled out, so that only the second antenna would operate as an antenna.

Since the antenna compressing means compresses the first antenna to vary the electrical length, the first antenna would not operate at the desired frequency band same as the frequency band of second antenna when the second antenna is pulled out. Thereby, the antenna characteristic of the mainly operating second antenna would not be disturbed by the first antenna, and thus fine antenna characteristic can be obtained when the antenna is pulled out.

Moreover, since the second antenna is electrically disconnected when the second antenna is contained, the antenna characteristic of first antenna would not be disturbed by the second antenna, and thus fine antenna characteristic can be obtained also when the antenna is contained.

Furthermore, in the present invention, the second antenna provides the nonconductive antenna with disconnecting means for electrically disconnecting the first antenna from the feeding circuits by pushing up the first antenna when the antenna is pulled out. When the second antenna is pulled out, the antenna disconnecting means pushes up and electrically disconnects the first antenna from the feeding circuits, so that only the second antenna would operate as an antenna.

In this manner, since the first antenna is electrically disconnected from the feeding circuits by the antenna disconnecting means, the first antenna would not operate when the second antenna is pulled out. Thereby, the antenna characteristic of the mainly operating second antenna would not be disturbed by the first antenna, and thus fine antenna characteristic can be obtained when the antenna is pulled out.

Furthermore, since the second antenna is electrically disconnected when the second antenna is contained, fine antenna characteristic can be obtained when the antenna is contained.

The nature, principle and utility of the invention will become more apparent from the following detailed description when read in conjunction with the accompanying figures in which like parts are designated by like reference numerals or characters.

DETAILED DESCRIPTION OF THE EMBODIMENT

Preferred embodiment of the present invention will be described with reference to the accompanying drawings:

(1) First Embodiment

Figure 1:
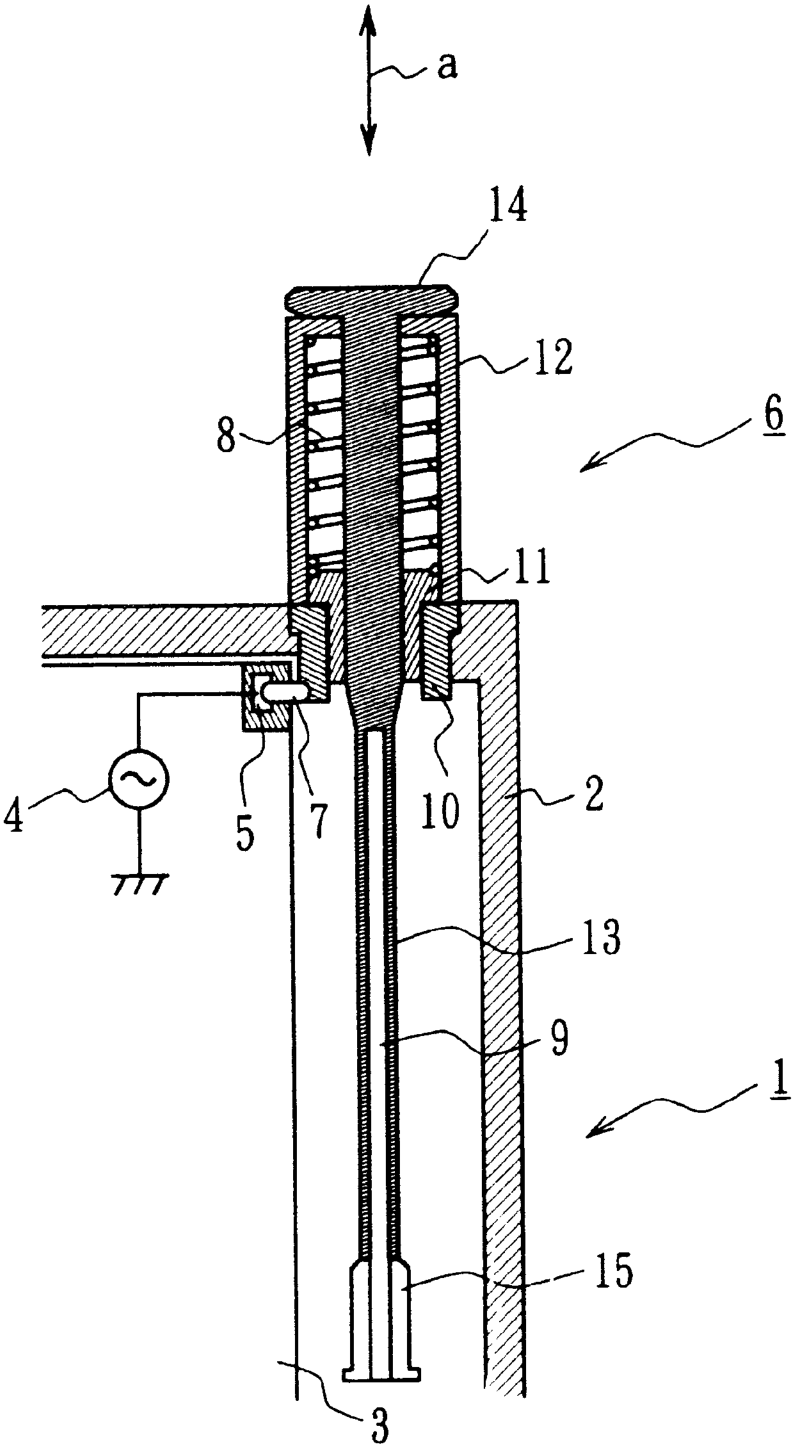
FIG. 1 (RELATED ART)
FIG. 1 is a sectional view illustrating the connecting state of each unit of the conventional antenna unit when the antenna unit is contained.
Figure 2:
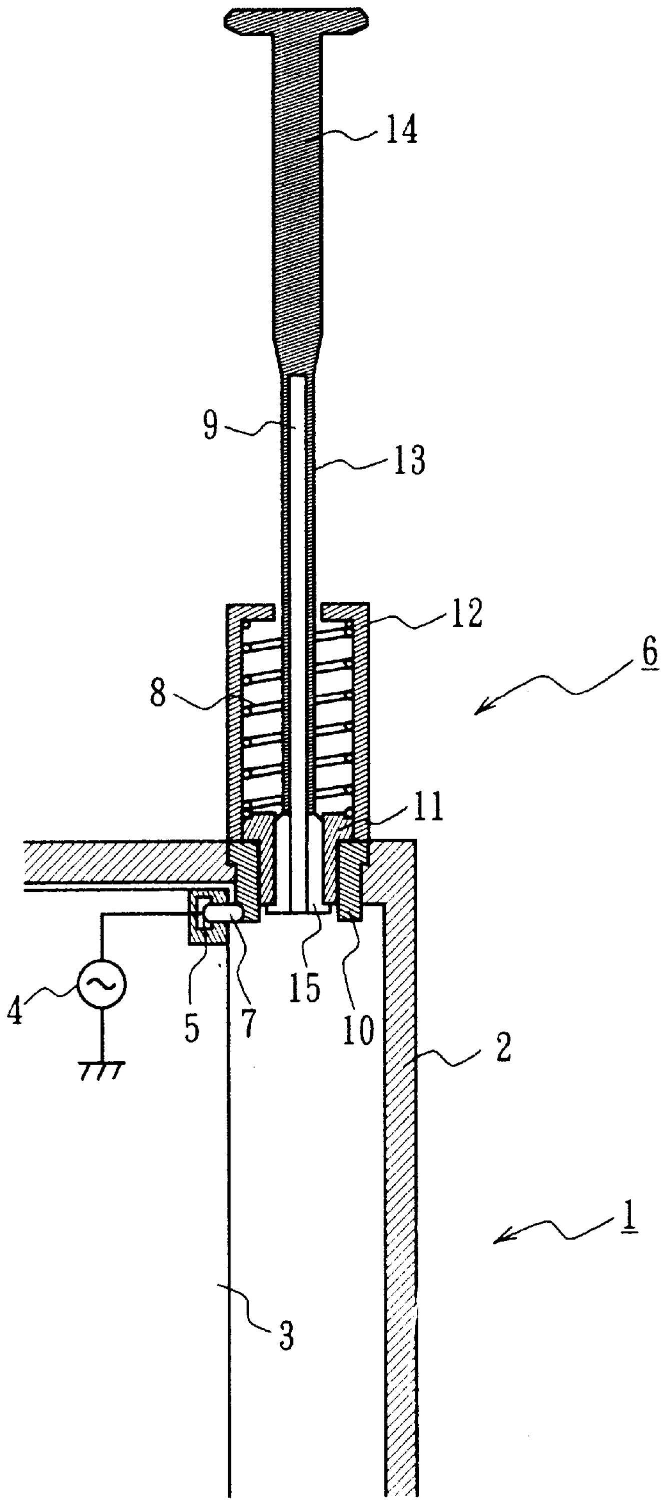
FIG. 2 (RELATED ART)
FIG. 2 is a sectional view illustrating the connecting state of each unit of the conventional antenna unit when the antenna unit is pulled out.
Figure 3:
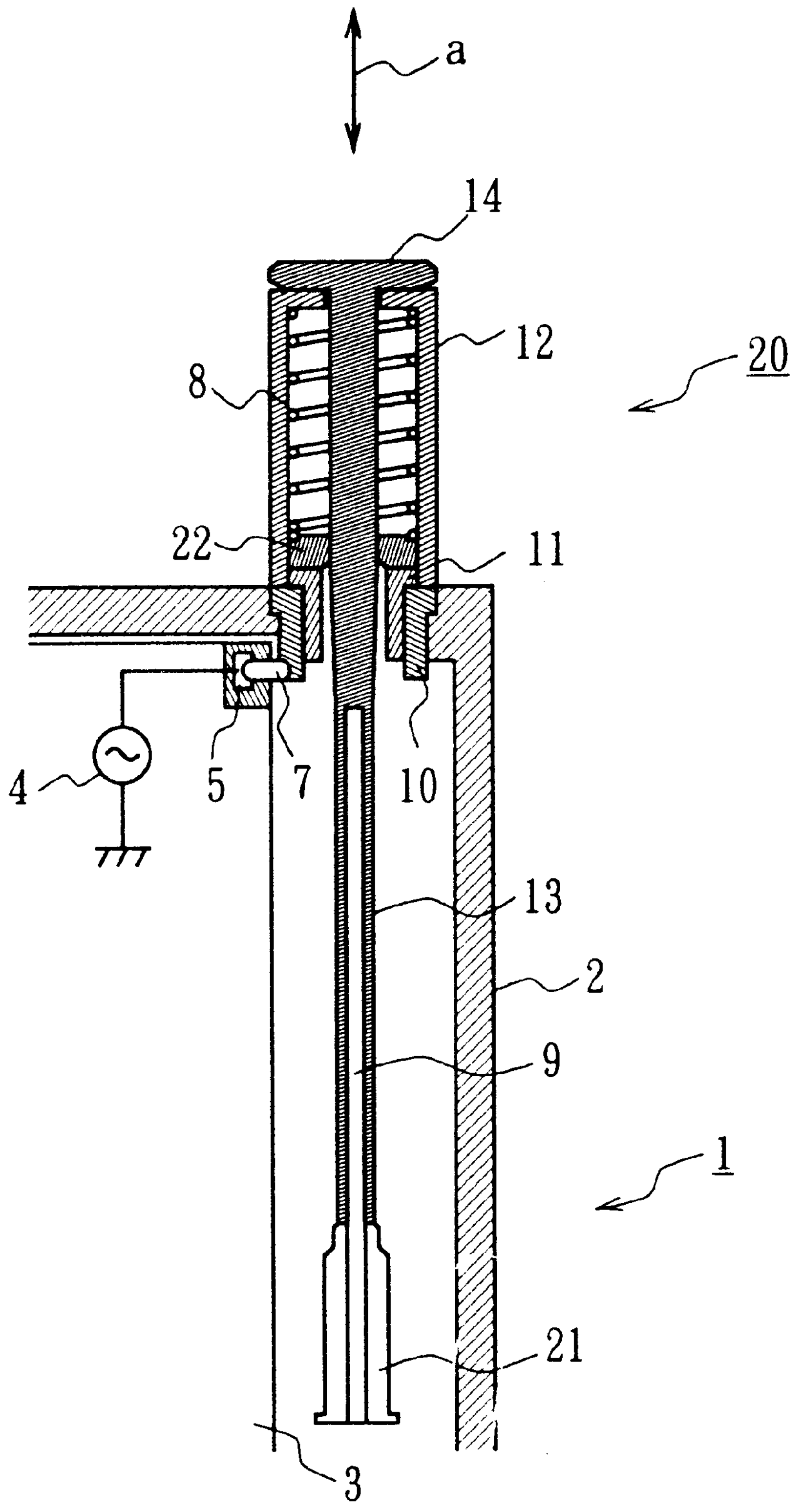
FIG. 3 is a sectional view illustrating the connecting state of each unit of an antenna unit according to the first embodiment of the present invention when the antenna unit is contained.
Figure 4:
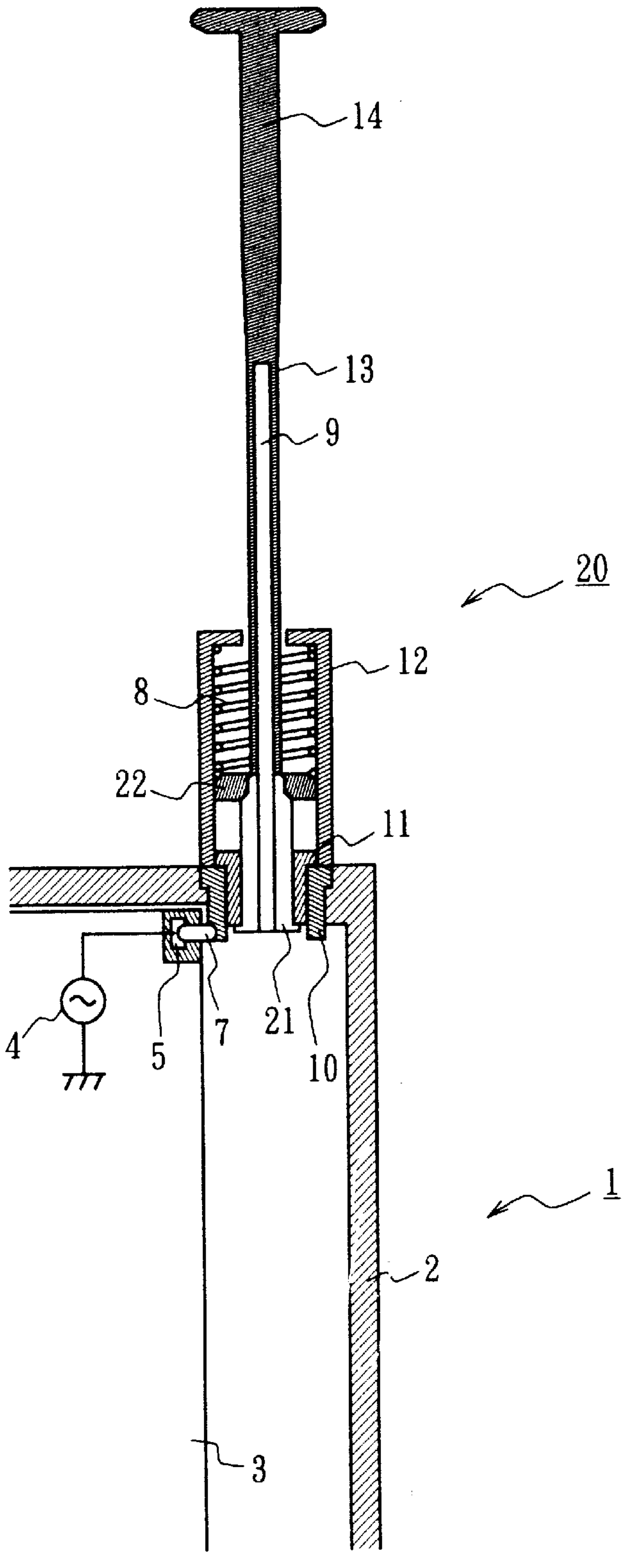
FIG. 4 is a sectional view illustrating the connecting state of each unit of the antenna unit according to the first embodiment when the antenna unit is pulled out.

Referring to FIGS. 3 and 4 in which the same numerals are added to the corresponding part in FIGS. 1 and 2, a numeral 20 shows an antenna unit according to the first embodiment as a whole. Also in the first embodiment, the antenna unit 20 is composed of two antennas, i.e., a spiral antenna 8 in which a conductor is formed in a spiral, and a linear antenna 9 in which a conductor is formed in a straight line. As shown in FIG. 4, in the antenna unit 20, when the antenna is pulled out, the spiral antenna 8 is pushed up and compressed by a stopper in pulling out 21 provided at the lower end of the linear antenna 9. Thereby, the electrical length of the spiral antenna 8 is varied and the spiral antenna 8 would not operate at the desired frequency band equal to the linear antenna 9. Thus, bad influence to the linear antenna 9 can be prevented and the antenna characteristic when the antenna is pulled out can be improved.

The description of the structure of each unit will hereinafter be set forth. Also in the first embodiment, the antenna 20 is attached to the main body 2 by screwing an antenna supporting metal fitting 11 into an antenna attaching metal fitting 10 which is incorporated into the main body 2. Furthermore, the main body 2 of portable radio terminal 1 is made of a nonmetallic material. The main body 2 contains a circuit board 3 on which various circuits necessary for radio terminal, e.g., a transmitting/receiving circuit 4 and an antenna matching circuit 5 are provided.

The linear antenna 9 can be slid in the spiral antenna 8 in the direction of the center axis of the spiral (it is shown by an arrow "a" in FIG. 3), thus, the linear antenna 9 can be pulled out and contained in the main body 2. The circumference of linear antenna 9 is covered with a nonconductive antenna cover 13 to avoid that the linear antenna 9 touches the user's body when pulled out. In addition, the antenna cover 13 has a function to protect the linear antenna 9 from transforming by the force from the outside when pulled out.

The upper end of the antenna cover 13 is extended upwards and the section is formed in T-shape (hereinafter, this portion is referred to as a stopper/knob 14). The linear antenna 9 can be pulled out by grabbing the stopper/knob 14. Since the stopper/knob 14 is touched to the upper end of antenna cover 12 provided on the circumference of spiral antenna 8 when the antenna is contained, the linear antenna 9 can be prevented falling down into the portable radio terminal 1.

A metallic stopper 21 of which the section is formed in convex is attached to the lower end of linear antenna 9 by screwing or caulking so as to be mechanically and electrically connected. The stopper 21 prevents the linear antenna 9 from being taken off because the lower end having a large diameter is touched to the lower end of antenna supporting metal fitting 11 when the linear antenna 9 is pulled out. Moreover, the stopper 21 is pinched with the antenna supporting metal fitting 11 when the linear antenna 9 is pulled out, and the linear antenna 9 is electrically connected to a feeding spring 7 via the antenna supporting metal fitting 11 and the antenna attaching metal fitting 10.

Note that, in the antenna unit 20, the spiral antenna 8 is pushed up and compressed by the stopper 21 when the antenna is pulled out, and the operational frequency band of spiral antenna 8 becomes different from the linear antenna 9. For this purpose, the stopper 21 is much longer than the conventional stopper 15 which is shown in FIG. 1 in the length of pulling out direction. Thus the spiral antenna 8 can be sufficiently compressed thereby making the operational frequency band of spiral antenna 8 certainly different from that of the linear antenna 9.

On the other hand, the circumference and the upper end of spiral antenna 8 (exclusive of the opening for linear antenna 9) are covered with the nonconductive antenna cover 12 to avoid that the spiral antenna 8 touches the user's body. In addition, the antenna cover 12 has a function to protect the spiral antenna 8 from transforming by the force from the outside.

The spiral antenna 8 is attached to an antenna fixing metal fitting 22 provided on the antenna supporting metal fitting 11 for being mechanically and electrically connected. This antenna fixing metal fitting 22 is mechanically free from the antenna supporting metal fitting 11. Thus when the linear antenna 9 is pulled out, the antenna fixing metal fitting 22 is pushed up by the stopper 21 and disconnected from the antenna supporting metal fitting 11, and when the linear antenna 9 is contained, the antenna fixing metal fitting 22 is depressed by force of the spring of the spiral antenna 8 and connected to the antenna supporting metal fitting 11. Thereby, the spiral antenna 8 is compressed by the antenna fixing metal fitting 22 when the linear antenna 9 is pulled out and pushed back to the former position by force of the spring and electrically connected to the feeding circuit such as the feeding spring 7 via the antenna fixing metal fitting 22 and the antenna supporting metal fitting 11 when the linear antenna 9 is contained.

Referring to the compression of the spiral antenna 8, when the linear antenna 9 is pulled out, the upper end of stopper in r pulling out 21 touches the lower end of antenna fixing metal fitting 22, so that if the stopper in pulling out 21 rise during the pulling out of the linear antenna 9, the antenna fixing metal fitting 22 is pushed up. Since the upper end of spiral antenna 8 is fixed by the antenna cover 12, the spiral antenna 8 is compressed when the antenna fixing metal fitting 22 rises.

According to the construction described above, as shown in FIG. 3, when the linear antenna 9 is contained, the antenna fixing metal fitting 22 is depressed by force of the spring of the spiral antenna 8 and touches the antenna supporting metal fitting 11. Thereby, the antenna fixing metal fitting 22 is electrically connected to the antenna supporting metal fitting 11 and, the spiral antenna 8 is electrically connected to the feeding spring 7 via the antenna fixing metal fitting 22, antenna supporting metal fitting 11, and the antenna attaching metal fitting 10 of the main body 2 in succession. As a result, the spiral antenna 8 would operate as the helical antenna grounded by a ground conductor of the circuit board 3 and the shield case.

On the other hand, the bottom of stopper/knob 14 is pinched to be held by the antenna fixing metal fitting 22 and the linear antenna 9 is fixed in the contained state. At this time, although the linear antenna 9 is connected to the antenna fixing metal fitting 22 via the stopper/knob 14 which is a member of the antenna cover 13, the linear antenna 9 is electrically disconnected from the feeding circuit such as the feeding spring 7 because the antenna cover 13 is nonconductive. Accordingly, the linear antenna 9 would not operate as antenna when contained, and only the spiral antenna 8 would operate as antenna. Therefore, in the antenna unit 20, stable and fine antenna characteristic can be obtained in the spiral antenna 8 when the antenna is contained without disturbance by the linear antenna 9.

On the contrary, as shown in FIG. 4, when the linear antenna 9 is pulled out, the stopper in pulling out 21 is pinched to be held by the antenna supporting metal fitting 11 and the linear antenna 9 is fixed in the pulled out state. At this time, since the stopper 21 is electrically connected to the antenna supporting metal fitting 11, the linear antenna 9 is electrically connected to the feeding spring 7 via the stopper 21, the antenna supporting metal fitting 11, and the antenna attaching metal fitting 10 in the main body 2 in succession. As a result, the linear antenna 9 would operate as the monopole grounded by the ground conductor of the circuit board 3 and the shield case.

In this connection, since the force of the antenna supporting metal fitting 11 for pinching and holding the stopper 21 is set to be stronger than the force of the spring of the spiral antenna 8, it can be provided that the spiral antenna 8 is pushed back in the downward direction which is shown in FIG. 3 by force of the spring of the spiral antenna 8 when the linear antenna 9 is pulled out.

On the other hand, the antenna fixing metal fitting 22 is pushed up by the stopper 21 when the linear antenna 9 and the spiral antenna 8 is compressed. At this time, the spiral antenna 8 is electrically connected to the feeding spring 7 via the antenna fixing metal fitting 22, the stopper 21, the antenna supporting metal fitting 11, and the antenna attaching metal fitting 10 in the main body 2 in succession. As a result, the spiral antenna 8 would operate as the helical antenna grounded by the ground conductor of the circuit board 3 and the shield case. However, since the electrical length of spiral antenna 8 is varied by the compression described above, the operational frequency band of spiral antenna 8 becomes different from the operational frequency band of linear antenna 9. Thus, the spiral antenna 8 would not operate as an antenna at the desired frequency band of the linear antenna 9. Therefore, it can be prevented that the antenna characteristic of linear antenna 9 would be disturbed by the spiral antenna 8 when the antenna is pulled out. In the antenna unit 20, stable and fine antenna characteristic can be obtained also when the antenna is pulled out.

In this connection, the principle of variation in the electrical length of spiral antenna 8 by the compression is as follows: Generally, as a parameter to determine the electrical length of a spiral antenna, there are the linear diameter of a conductor forming the spiral antenna, the spiral diameter where the conductor is wound in spiral, the number of windings of the conductor (i.e., the number of turns), and the pitch width between the conductors. If one of these parameters is varied, the electrical length of spiral antenna would be varied. In the first embodiment, the electrical length of spiral antenna 8 is varied by varying the pitch width between the conductors by compressing the spiral antenna 8 based on the principle described above.

Note that, the principle that the operational frequency band varies by varying the electrical length of spiral antenna 8 is as follows: Basically, in antennas, the electrical length of an antenna is adjusted to, e.g., $\lambda/4$ (here, $\lambda$ represents wavelength) by matching with the operational frequency band, to realize the antenna operation at the desired frequency band. Accordingly, if varying the electrical length of antenna, the wavelength $\lambda$ a radio wave suitable for the antenna would be varied, and the operational frequency band should be varied accordingly.

In the first embodiment, when the antenna is pulled out, the antenna fixing metal fitting 22 is pushed up by the stopper in pulling out 21 provided at the lower end of linear antenna 9 and to compress the spiral antenna 8, thus the electrical length of spiral antenna 8 is varied. Thereby, in the first embodiment, the operational frequency band becomes different from the operational frequency band of linear antenna 9 when the antenna is pulled out, thus bad influence by the spiral antenna 8 to the antenna characteristic of linear antenna 9 can be avoided, and fine antenna characteristic can be obtained.

According to the construction described above, since the spiral antenna 8 is compressed to vary the electrical length of spiral antenna 8 when the linear antenna 9 is pulled out, the spiral antenna 8 would not operate at the desired frequency band when the antenna is pulled out, thus fine antenna characteristic can be obtained. Thereby in the antenna unit 20 fine antenna characteristic can be obtained when the antenna is contained/pulled out.

Applying the antenna unit 20 to the portable radio terminal 1, a radio terminal excellent in portability, in which the linear antenna 9 can be contained when carry can be realized. Furthermore, a radio terminal in which fine antenna characteristic can be obtained when talking by pulling out the linear antenna 9 until the position where no body effect are present, and high-tone-quality communication can be performed, can be realized.

(2) Second Embodiment

Figure 5:
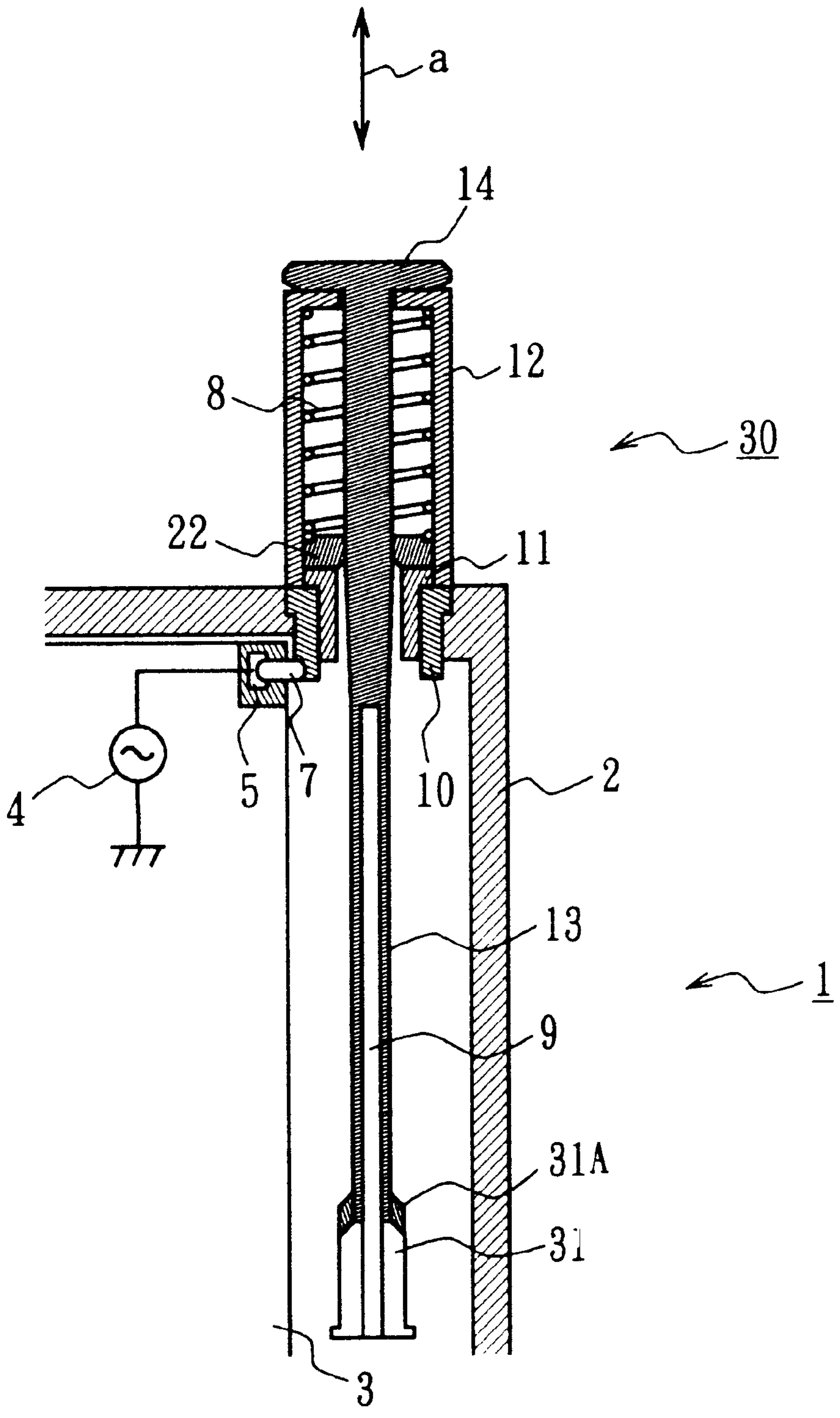
FIG. 5 is a sectional view illustrating the connecting state of each unit of an antenna unit according to the second embodiment of the present invention when the antenna unit is contained.
Figure 6:
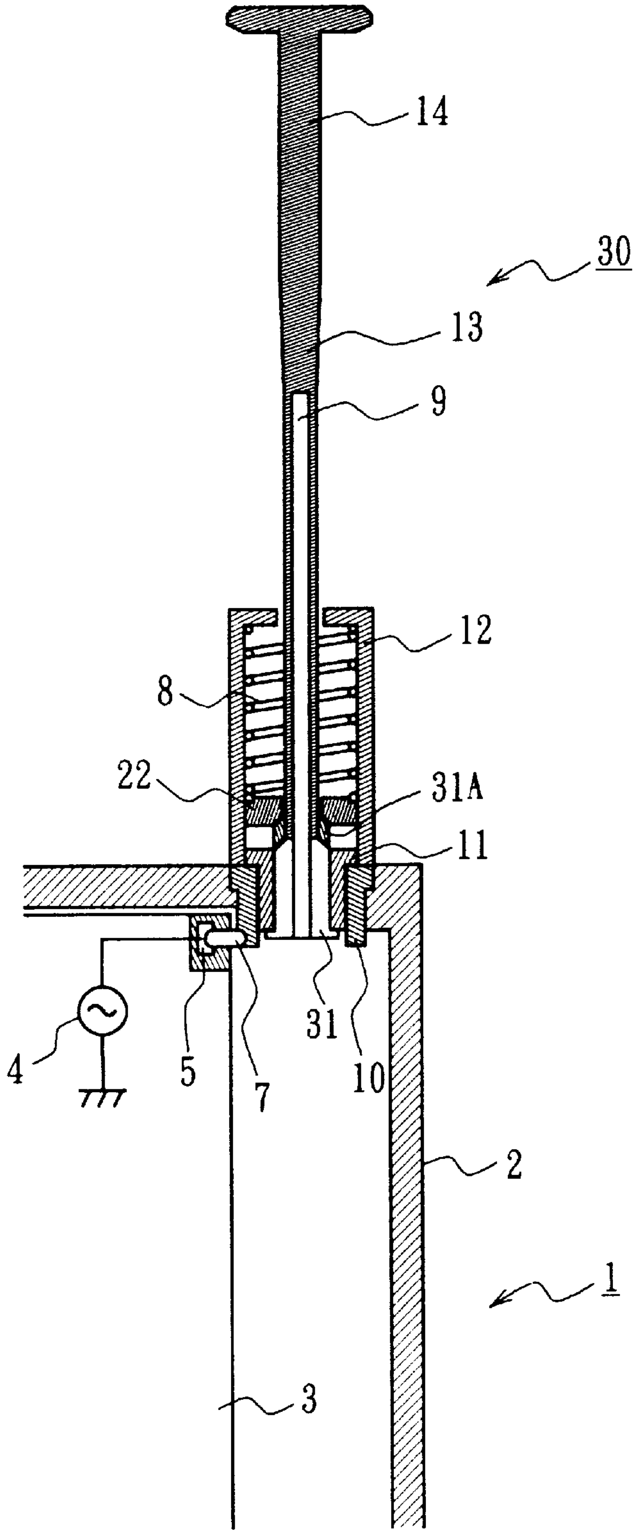
FIG. 6 is a sectional view illustrating the connecting state of each unit of the antenna unit according to the second embodiment when the antenna unit is pulled out.

Referring to FIGS. 5 and 6 in which the same reference numerals are added to the corresponding part in FIGS. 3 and 4, a reference numeral 30 shows an antenna unit according to the second embodiment as a whole. In the second embodiment, a spiral antenna 8 is pushed up when a linear antenna 9 is pulled out, to electrically disconnect the spiral antenna 8 from feeding circuits (i.e., an antenna matching circuit 5 and a feeding spring 7). Thus the spiral antenna 8 would not operate when the antenna is pulled out, and antenna characteristic can be improved.

The detail will be described hereinafter with the description of the structure of each unit. Also in the second embodiment, the antenna unit 30 is composed of two antennas, i.e., the spiral antenna 8 and the linear antenna 9.

In the same manner as the first embodiment, the linear antenna 9 can be slid in the spiral antenna 8 in the direction of the center axis of the spiral (it is shown by an arrow "a" in FIG. 5). Thus the linear antenna 9 can be pulled out from and contained in the portable radio terminal 1. The circumference of linear antenna 9 is covered with a nonconductive antenna cover 13 to protect the antenna and prevent that the antenna touches the user's body. A nonconductive stopper/knob 14 of which the section is formed in T-shape is provided at the upper end of the antenna cover 13. The stopper/knob in containing 14 prevents the linear antenna 9 falling into the portable radio terminal 1. Besides, the linear antenna 9 can be easily pulled out by grabbing the stopper/knob in 14.

A metallic stopper 31 of which the section is formed in convex is attached to the lower end of linear antenna 9 by screwing or caulking so as to be mechanically and electrically connected. The stopper in pulling out 31 prevents that the linear antenna 9 from being taken off because the lower end having a large diameter is touched to the lower end of antenna supporting metal fitting 11 when the linear antenna 9 is pulled out. Moreover, the stopper 31 is pinched with the antenna supporting metal fitting 11 when the linear antenna 9 is pulled out, and the linear antenna 9 is electrically connected to a feeding spring 7 via the antenna supporting metal fitting 11 and the antenna attaching metal fitting 10.

A nonconductive spacer 31A is provided on the upper end of stopper 31 to cover the upper surface of the stopper in pulling out 31. When the linear antenna 9 is pulled out, the spacer 31A pushes up and compresses the spiral antenna 8, and electrically disconnects the spiral antenna 8 from the feeding circuits, i.e., the feeding spring 7 etc.

On the other hand, the spiral antenna 8 is attached to an antenna fixing metal fitting 22 provided on the antenna supporting metal fitting 11 so as to be mechanically and electrically connected. The antenna fixing metal fitting 22 is mechanically free from the antenna supporting metal fitting 11 in the same manner as the first embodiment. So that when the linear antenna 9 is pulled out, the antenna fixing metal fitting 22 is pushed up by the spacer 31A of the stopper in pulling out 31 and separated from the antenna supporting metal fitting 11, and when the linear antenna 9 is contained, the antenna fixing metal fitting 22 is depressed by force of the spring of the spiral antenna 8 and connected to the antenna supporting metal fitting 11. Therefore, when the linear antenna 9 is pulled out, the spiral antenna 8 is pushed up and compressed by the antenna fixing metal fitting 22, and when the linear antenna 9 is contained, the antenna fixing metal fitting 22 is pushed back to the former position by force of the spring and electrically connected to the feeding circuits, i.e., the feeding spring 7 etc., via the antenna fixing metal fitting 22 and the antenna supporting metal fitting 11.

The circumference and the upper end of spiral antenna 8 (exclusive of the opening for the linear antenna 9) are covered with a nonconductive antenna cover 12 to protect the antenna and avoid that the antenna touches the user's body.

According to the structure described above, as shown in FIG. 5, when the linear antenna 9 is contained, the antenna fixing metal fitting 22 is depressed by force of the spring of the spiral antenna 8 and touches the antenna supporting metal fitting 11. Thereby, the antenna fixing metal fitting 22 is electrically connected to the antenna supporting metal fitting 11, thus the spiral antenna 8 is electrically connected to the feeding spring 7 via the antenna fixing metal fitting 22, the antenna supporting metal fitting 11, and the antenna attaching metal fitting 10 in the main body 2 in succession. As a result, the spiral antenna 8 would operate as the helical antenna grounded by the ground conductor of the circuit board 3 and the shield case.

On the other hand, the bottom of containing stopper/knob 14 is pinched with the antenna fixing metal fitting 22 and the linear antenna 9 is fixed in the contained state. At this time, the linear antenna 9 is connected to the antenna fixing metal fitting 22 via the containing stopper/knob 14 which is a part of the antenna cover 13. However, because the antenna cover 13 is nonconductive, the linear antenna 9 is electrically disconnected from the feeding circuits, i.e., the feeding spring 7 etc. As a result, the linear antenna 9 would not operate as antenna when contained, and only the spiral antenna 8 would operate as antenna. Thereby, in the antenna unit 30, when the antenna is contained, stable and fine antenna characteristic of spiral antenna 8 can be obtained without disturbance by the linear antenna 9.

On the contrary, as shown in FIG. 6, when the linear antenna 9 is pulled out, the stopper 31 is pinched with the antenna supporting metal fitting 11, and the linear antenna 9 is fixed in the pulled out state. At this time, the stopper 31 is electrically connected to the antenna supporting metal fitting 11, so that the linear antenna 9 is electrically connected to the feeding spring 7 via the stopper in pulling out 31, the antenna supporting metal fitting 11, and the antenna attaching metal fitting 10 in the main body 2 in succession. As a result, the linear antenna 9 would operate as the monopole antenna grounded by the ground conductor of the circuit board 3 and the shield case.

In this connection, since the force of the antenna supporting metal fitting 11 for pinching and holding stopper 31 is set to be stronger than the force of the spring of the spiral antenna 8, it can be avoided that the linear antenna 9 is pushed back in the downward direction which is shown in FIG. 6 by force of the spring of the spiral antenna 8 when the linear antenna 9 is pulled out.

On the other hand, the antenna fixing metal fitting 22 is pushed up by the spacer 31A of the stopper 31 with the pulling out of the linear antenna 9, and the spiral antenna 8 is compressed. At this time, the spiral antenna 8 is connected to the antenna supporting metal fitting 11 via the antenna fixing metal fitting 22, the spacer 31A, and the stopper 31 in succession. However, because the spacer 31A is nonconductive, the spacer 31A is electrically disconnected from the feeding circuits, i.e., the feeding spring 7 etc. As a result, the spiral antenna 8 would not operate as antenna, and only the linear antenna 9 would operate as antenna. Therefore, in the antenna unit 30, the stable and fine antenna characteristic of linear antenna 9 can be obtained without disturbance by the spiral antenna 8 when the antenna is pulled out.

In this manner, in the second embodiment, the nonconductive spacer 31A is provided on the upper end of the stopper 31 to push up the antenna fixing metal fitting 22 when the antenna is pulled out, and electrically disconnect the spiral antenna 8 from the feeding circuits, i.e., the feeding spring 7 etc. Thereby, bad influence by the spiral antenna 8 on the antenna characteristic of linear antenna 9 can be avoided when the antenna is pulled out, and thus fine antenna characteristic can be obtained.

According to the structure described above, when the linear antenna 9 is pulled out, the spiral antenna 8 is pushed up by the spacer 31A of the stopper in pulling out 31 so as to electrically disconnect the spiral antenna 8 from the feeding circuits, so that fine antenna characteristic can be obtained because the spiral antenna 8 would not operate when the antenna is pulled out. Thereby, the antenna unit 30 in which fine antenna characteristic can be obtained when the antenna is contained/pulled out, can be realized.

Applying the antenna unit 20 to the portable radio terminal 1, a radio terminal excellent in portability, i.e., the linear antenna 9 can be contained when carry, can be realized. Furthermore, a radio terminal in which fine antenna characteristic can be obtained when talking by pulling out the linear antenna 9 until the position where no body effect are present, and high-tone-quality communication can be performed, can be realized.

(3) Other Embodiments

The embodiments described above have been dealt with the case of forming the feeding spring 7, the antenna attaching metal fitting 10, the antenna supporting metal fitting 11, the antenna fixing metal fitting 22, and the stoppers 21 and 31, of the metallic material. The present invention, however, is not only limited to this but also the same effects as described above can be obtained of forming by the predetermined conductive material.

The embodiments described above have been dealt with the case of connecting the receiving/transmitting circuit 4 to the antenna unit 20, 30. The present invention, however, is not only limited to this but also the receiving/transmitting circuit 4 may be connected to either a receiving circuit or a transmitting circuit provided that the antenna unit 20, 30 is used for only receiving or only transmitting.

The embodiments described above have dealt with the case of forming the main body 2 of portable radio terminal 1 of the nonmetallic material. The present invention, however, is not only limited to this but also the main body 2 may be formed of a metallic material provided that a spacer should be provided so that the antenna attaching metal fitting 10 is indirectly connected to the metallic main body 2.

The embodiments described above have dealt with the case of forming the linear antenna 9 merely of the linear conductor. The present invention, however, is not only limited to this but also the same effects can be obtained as described above, by forming the linear antenna 9 of a rod antenna in which linear conductors are elastically combined in multistage.

Moreover, the present invention is not only the embodiments described above, but also the linear antenna 9 may be formed of an elastic conductor, a conductor in which a spring is wounded precisely, and a spiral conductor having a small diameter, to protect from breakage.

The embodiments described above have dealt with the case of attaching the antenna supporting metal fitting 11 to the antenna attaching metal fitting 10 by screwing. The present invention, however, is not only limited to this but also the antenna supporting metal fitting 11 may be attached by means of another method such as caulking.

The embodiments described above have dealt with the case of attaching the stopper 21, 31 to the linear antenna 9 by screwing or caulking. The present invention, however, is not only limited to this but also the stopper in pulling out 21, 31 may be attached to the linear antenna by means of another method such as molding.

The first embodiment described above has dealt with the case of providing the stopper in pulling out 21 which is longer in the pulling out direction than the conventional stopper at the lower end of linear antenna 9, so that the spiral antenna 8 is pushed up and compressed by the stopper in pulling out 21 when the linear antenna 9 is pulled out. The present invention, however, is not only limited to this but also the same effects as described above can be obtained by providing the antenna compressing means for varying the electrical length of spiral antenna by pushing up and compressing the spiral antenna when the linear antenna is pulled out on the linear antenna.

The second embodiment described above has dealt with the case of merely providing the nonconductive spacer 31A on the upper end of stopper in pulling out 31. The present invention, however, is not only limited to this but also may enlarge the antenna cover 31 neighboring the upper end of stopper in pulling out 13 to push up the spiral antenna B. In short, the same effects as described above can be obtained by providing the nonconductive antenna disconnecting means for electrically disconnecting the spiral antenna from the feeding circuit by pushing up the spiral antenna when the linear antenna is pulled out.

While there has been described the preferred embodiments of the invention, it will be obvious to those skilled in the art that various changes and modifications may be made, therefore, to cover all such changes and modifications as fall within the true spirit and scope of the invention.

What is claimed is:

1. An antenna unit for use in an electronic apparatus including a feeding circuit and having a spiral antenna, and a linear antenna mounted for sliding movement in said spiral antenna in a direction of a center axis of said spiral antenna, wherein said linear antenna comprises a nonconductive antenna cover for electrically disconnecting said linear antenna from said feeding circuit when said linear antenna is contained in said electronic apparatus, and for protecting said linear antenna when said linear antenna is pulled out from said electronic apparatus; and antenna compressing means for pushing up and compressing said spiral antenna for varying an electrical length of said spiral antenna, wherein when said linear antenna is contained, said linear antenna is electrically disconnected from said feeding circuit by said antenna cover, so that only said spiral antenna operates as an antenna, and wherein when said linear antenna is pulled out, said spiral antenna is compressed by said antenna compressing means and the electrical length is varied, so that only said linear antenna operates as an antenna.

2. The antenna unit according to claim 1, wherein said spiral antenna is pushed back to a former position by a force of a spring of said spiral antenna, and ia electrically connected to said feeding circuit.

3. An antenna unit for use in an electronic apparatus including a feeding circuit and having a spiral antenna, and a linear antenna mounted for sliding movement in said spiral antenna in a direction of a center axis of said spiral antenna, wherein said linear antenna comprises a nonconductive antenna cover for electrically disconnecting said linear antenna from said feeding circuit when said linear antenna is contained in said electronic apparatus, and for protecting said linear antenna when said linear antenna is pulled out from said electronic apparatus; and nonconductive antenna disconnecting means for pushing up and electrically disconnecting said spiral antenna from said feeding circuit when said linear antenna is pulled out, wherein when said linear antenna is contained, said linear antenna is electrically disconnected from said feeding circuit by said antenna cover, so that only said spiral antenna operates as an antenna, and wherein when said linear antenna is pulled out, said spiral antenna is pushed up and electrically disconnected from said feeding circuit by said antenna disconnecting means, so that only said linear antenna operates as an antenna.

4. The antenna unit according to claim 3, wherein said spiral antenna is pushed back to a former position by a force of a spring of said spiral antenna, and is electrically connected to said feeding circuit.

5. A portable radio terminal including a body, a feeding circuit, and an antenna unit having a spiral antenna, and a linear antenna mounted for sliding movement in said spiral antenna in a direction of a center axis of said spiral antenna, wherein said linear antenna comprises a nonconductive antenna cover for electrically disconnecting said linear antenna from said feeding circuit when said linear antenna is contained in said body, and for protecting said linear antenna when said linear antenna is pulled out of said body; and antenna compressing means for pushing up and compressing said spiral antenna for varying an electrical length of said spiral antenna, wherein when said linear antenna is contained, said linear antenna is electrically disconnected from said feeding circuit by said antenna cover, so that only said spiral antenna operates as an antenna, and wherein when said linear antenna is pulled out, said spiral antenna is compressed by said antenna compressing means and the electrical length is varied, so that only said linear antenna operates as an antenna.

6. The portable radio terminal according to claim 5, wherein said spiral antenna is pushed back to a former position by a force of a spring of said spiral antenna, and is electrically connected to said feeding circuit.

7. A portable radio terminal including a body, a feeding circuit, and an antenna unit having a spiral antenna, and a linear antenna sliding in said spiral antenna in a direction of the center axis of said spiral antenna, wherein said linear antenna comprises a nonconductive antenna cover for electrically disconnecting said linear antenna from said feeding circuit when said linear antenna is contained in said body, and for protecting said linear antenna when said linear antenna is pulled out of said body; and nonconductive antenna disconnecting means for pushing up and electrically disconnecting said spiral antenna from said feeding circuit when said linear antenna is pulled, wherein when said linear antenna is contained, said linear antenna is electrically disconnected from said feeding circuit by said antenna cover, so that only said spiral antenna operates as an antenna, and wherein when said linear antenna is pulled out, said spiral antenna is pushed up and electrically disconnected from said feeding circuit by said antenna disconnecting means, so that only said linear antenna operates as an antenna.

8. The portable radio terminal according to claim 7, wherein said spiral antenna is pushed back to a former position by a force of a spring of said spiral antenna, and is electrically connected to said feeding circuit.

* * * * *